United States Patent [19]

Minott

[11] 4,444,464
[45] Apr. 24, 1984

[54] DUAL APERTURE MULTISPECTRAL SCHMIDT OBJECTIVE

[75] Inventor: Peter O. Minott, Bowie, Md.

[73] Assignee: The United States of America as represented by the Administrator of the National Aeronautics and Space Administration, Washington, D.C.

[21] Appl. No.: 378,535

[22] Filed: May 13, 1982

[51] Int. Cl.³ ............... G02B 27/10; G02B 17/08
[52] U.S. Cl. .................... 350/172; 350/173; 350/443
[58] Field of Search ............ 350/442, 443, 172, 173, 350/503, 557, 294

[56] References Cited

U.S. PATENT DOCUMENTS

| | | | |
|---|---|---|---|
| 2,403,660 | 5/1945 | Hayward | 88/57 |
| 2,508,764 | 5/1950 | Miller | 350/443 |
| 2,551,852 | 5/1951 | Rina | 88/57 |
| 2,703,506 | 3/1951 | Kelly . | |
| 2,920,136 | 6/1955 | Peterson | 178/6 |
| 3,196,366 | 7/1965 | Simpson | 350/442 |
| 3,436,665 | 4/1969 | Rigrod | 350/294 |
| 3,507,547 | 4/1970 | Thomas | 350/557 |
| 3,510,203 | 8/1967 | Richardson | 350/200 |
| 3,604,785 | 9/1971 | Travis et al. | 350/442 |
| 3,963,328 | 6/1976 | Abel | 350/294 |
| 4,009,941 | 3/1977 | Verdijk et al. | 350/173 |
| 4,103,160 | 7/1978 | Moss | 250/334 |
| 4,161,349 | 7/1979 | Norman | 350/173 |

*Primary Examiner*—John K. Corbin
*Assistant Examiner*—Paul Dzierzynski
*Attorney, Agent, or Firm*—Robert E. Bushnell; John O. Tresansky; John R. Manning

[57] ABSTRACT

A dual aperture, off-axis catadioptic Schmidt objective (40) is formed by symmetrically aligning two pairs of Schmidt objectives (12, 14) on opposite sides of a common plane (x, z). Each objective has a spherical primary mirror (16/18) with a spherical focal plane (44/46) and center of curvature (20/22) aligned along an optic axis (36/38) laterally spaced apart from the common plane. A multiprism beamsplitter (44/46) with buried dichroic layers (81-83) and a convex entrance (48) and concave exit (52a-52f) surfaces optically concentric to the center of curvature may be positioned at the focal plane. The primary mirrors of each objective may be connected rigidly together and may have equal or unequal focal lengths.

18 Claims, 5 Drawing Figures

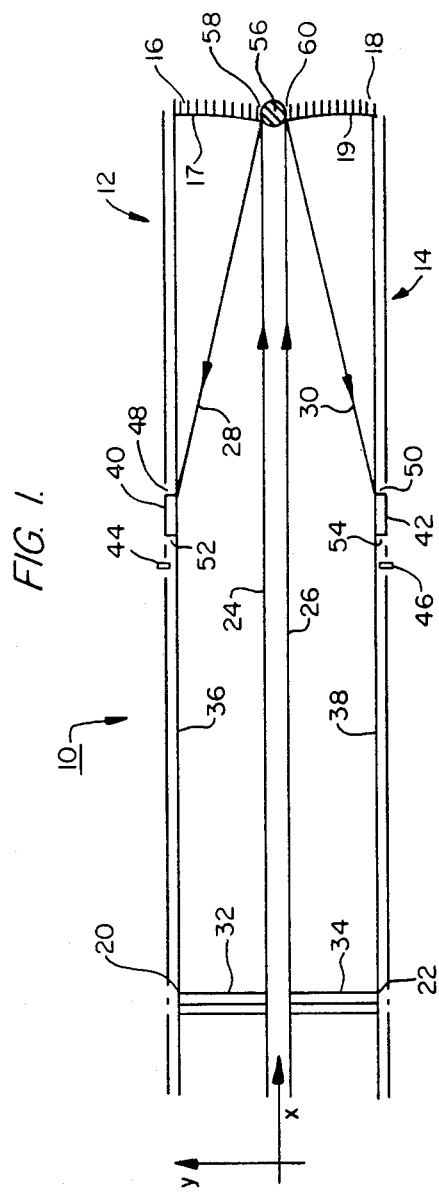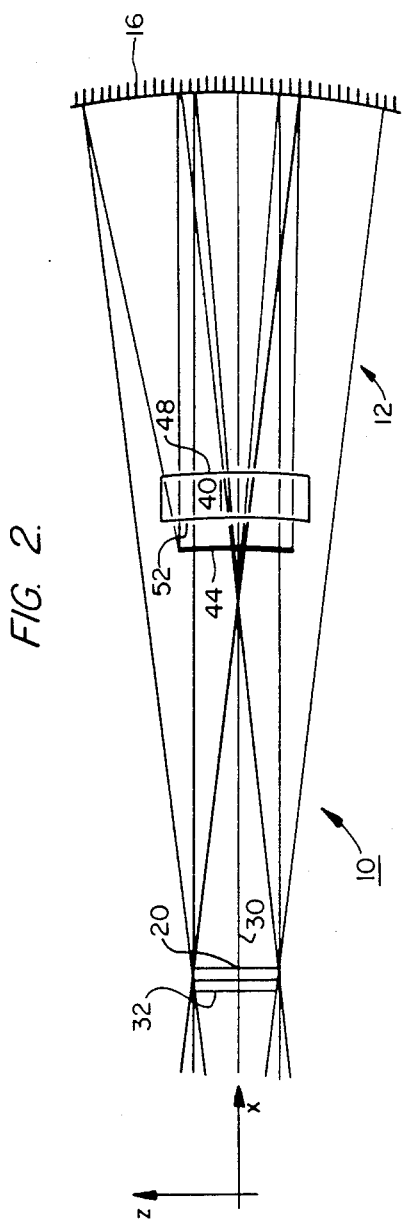

DUAL APERTURE MULTISPECTRAL SCHMIDT OBJECTIVE

ORIGIN OF THE INVENTION

The invention described herein was made by an employee of the United States Government and may be manufactured and used by or for governmental purposes without the payment of any royalties thereon or therefor.

TECHNICAL FIELD

The invention relates to catadioptic instruments generally and, more particularly, to Schmidt optical objectives for multispectral mapping systems.

BACKGROUND ART

High resolution multispectral mapping of the surface of the earth with air or spaceborne instruments requires optical objectives providing precise registration between counterpart detectors in the image planes of all spectral bands. Although there are numerous Schmidt optical systems for focusing multispectral images, those presently available systems which are sufficiently accurate to be used with multispectral instruments for mapping the surface of the earth must be optically linked to the mapping instrument by precision mechanical scanning mechanisms. The multispectral scanner (MSS) and the thematic mapper (TM) developed by the National Aeronautics and Space Administration are two examples of such instruments. Both use rapidly moving, mechanically driven, scanning mirrors to produce a whiskbroom scanning action of photodetectors upon ground resolution elements. Mechanical scanning mechanisms, however, inherently lose precision with continuous use, lack long-term reliability, generate undesired thrust forces which disturb other instruments, and have size limitations that limit the degree of resolution obtainable from a multispectral mapping instrument.

A French optical system known as a "Spot" instrument, currently under development, avoids the problems of mechanical scanning systems by using a two on-axis catadioptic Schmidt objectives boresighted to scan different, but adjoining fields of view. Orbital motion of the spacecraft sweeps a detector array across the earth in a direction perpendicular to the long dimension of the swath of earth scanned, producing a scanning effect known as pushbroom scanning. Eight linear detector arrays produce a four spectral band mapping system. The on-axis structure of the Spot instrument, however, produces a central observation which causes a degree of diffraction precluding operation of the system in a high resolution, short wavelength infrared (SWIR) mode. Also, the on-axis structure limits the space available for incorporation of a beamsplitter into the system which restricts application of the system to three, relatively closely spaced bands in the visible spectrum.

STATEMENT OF THE INVENTION

Accordingly, it is an object of the present invention to provide an improved Schmidt optical objective.

It is another object to provide a Schmidt optical objective free of paraxial obscuration.

It is still another object to provide a Schmidt optical objective suitable for high resolution in the near and intermediate infrared band.

It is yet another object to provide a Schmidt optical objective permitting a higher signal-to-noise ratio.

It is a further object to provide a Schmidt optical objective compatible with a multispectral beamsplitter functioning over widely separated bands in the visible and invisible spectra.

It is a still further object to provide a Schmidt optical objective which can produce a greater number of precisely registered image planes.

It is a yet further object to provide a Schmidt optical objective which can produce a greater number of image planes of precisely the same focal length and distortion.

It is also an object to provide a Schmidt optical objective which can be optically linked to a multispectral mapping system by stationary devices.

These and other objects are achieved with a dual aperture optical configuration having a pair of off-axis catadioptic Schmidt primary objectives. The configuration is formed by two rigidly connected, side-by-side, off-axis spherical reflectors symmetrically aligned with parallel optical axes along a common plane of symmetry with two side-by-side refractive corrector plates located as aperture stops positioned at the centers of curvature of the spherical reflectors. A pair of multispectral dichroic beamsplitters having entrance and exit faces concentric to their respective aperture steps are symmetrically positioned about the common plane at the spherical focal planes of the spherical reflectors.

BRIEF DESCRIPTION OF THE DRAWINGS

A more complete appreciation of this invention and many of the attendant advantages thereof will be readily apparent as the same becomes better understood by reference to the following detailed description when considered in conjunction with the accompanying drawings in which like reference symbols indicate the same or similar components, wherein:

FIG. 1 is a top plan view showing an embodiment of the invention.

FIG. 2 is a front plan view of the embodiment shown in FIG. 1.

DETAILED DESCRIPTION OF THE INVENTION

Figure 3:
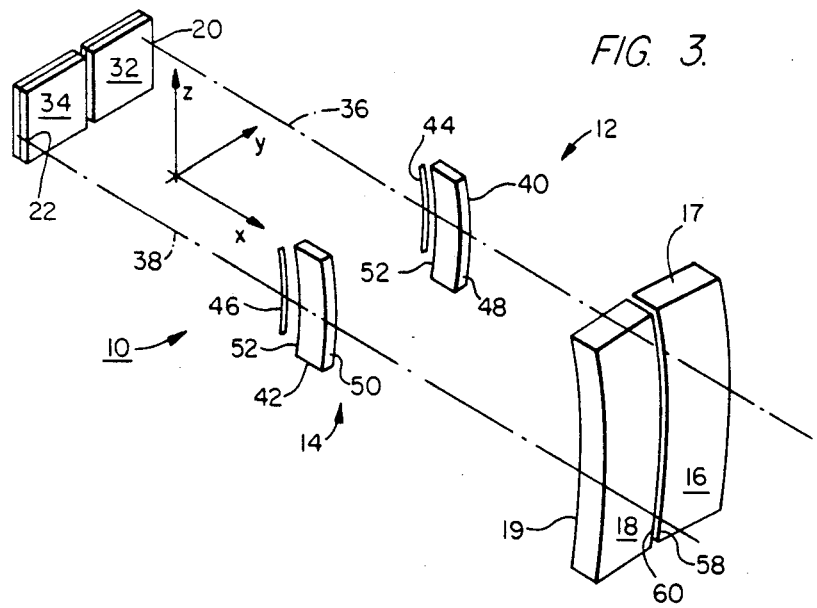
FIG. 3 is an isometric projection showing the optical alignment of the elements forming the configuration of FIG. 1.

FIGS. 1 and 2 illustrate the Schmidt optical system 10 of the invention in right angle planar views taken along the x, y and x, z planes, respectively. The system is formed of a pair of side-by-side catadioptic Schmidt objectives 12, 14. The primary elements of the objectives are a pair of spherical mirrors 16, 18 symmetrically positioned side-by-side on opposite sides of the central x, z common plane. As shown in FIG. 3, the curvatures of the spherical reflecting surfaces 17, 19 of spherical mirrors 16, 18 are oriented to diverge outward with their centers 20, 22, respectively, separated on opposite sides of the common x, y plane. The orientation of the curvatures of spherical mirrors 16, 18 causes incoming paraxial light rays 24, 26 to be divergingly reflected away from the common x, z plane as rays 28, 30, respectively. Refractor lens plates 32, 34 are symmetrically positioned side-by-side on opposite sides of the common x, z plane, between the optical axes 36, 38, respectively, of the objectives to correct for spherical aberrations by introducing spherical aberrations into transmitted light rays equal and opposite to the total of the spherical aberrations caused by the respective spherical mirrors. Corrector lens 32, 34 form dual aperture stops. Refractive beamsplitters 40, 42 are positioned along the optical axes 36, 38 at the respective focal planes 44, 46 of the objectives. Concavity of spherical mirrors 16, 18 causes focal planes 44, 46 to be spherical and backward curving. Each beamsplitter accepts the image forming energy of a single optical objective 12, 14. To maintain the concentricity of the Schmidt system 10, the entrance 48, 50 and exit faces 52, 54 of the beamsplitters preferably are spherically concentric to the respective aperture stops of each objective 12, 14.

Figure 4:
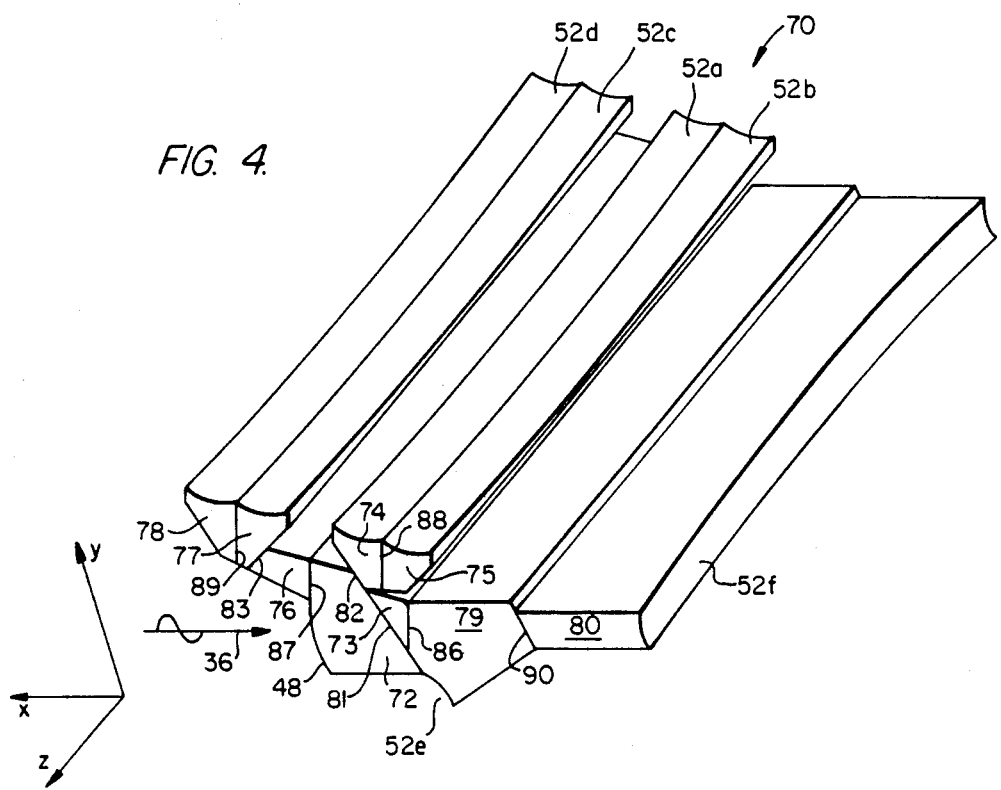
FIG. 4 is an isometric view showing the prism arrangement of a dichroic beamsplitter element.
Figure 5:
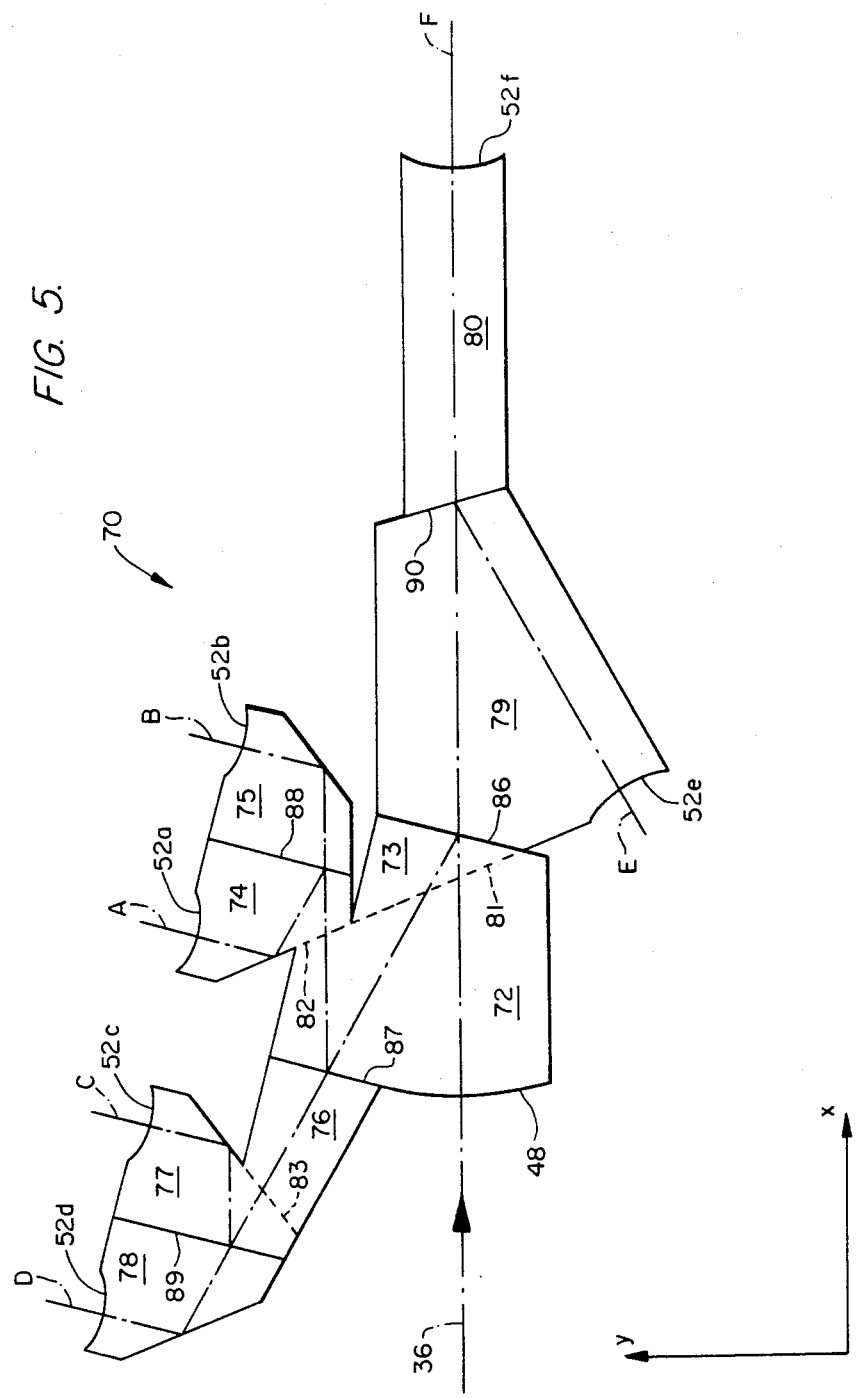
FIG. 5 is a front view showing the operation of the dichroic beamsplitter element of FIG. 4.

The divergence of reflected central light rays 28, 30 caused by the outwardly directed orientation of the curvatures of the spherical mirrors 16, 18 causes the focal planes to be located outside of the paths of the central rays. This allows the beamsplitter 40, 42 to occupy a larger space at the focal planes without affecting resolution of the images. FIGS. 4 and 5 illustrate an assembly 70 of nine prisms 72–80 of conventional prism materials which may be used as one of the beamsplitters 40, 42. Prisms 72 and 73, 72 and 74, 76 and 77 are cemented together along joints 81, 82 and 83 respectively. Prism assembly 70 uses thin multilayer dielectric coatings 86–90 as dichroic elements between prisms 72 and 79, 72 and 76, 74 and 75, 77 and 78, and 79 and 80, respectively, to split an image into six different spectral bands by reflecting the shorter wavelengths. In assembly 70, the shorter wavelength bands A through D are reflected while the longer wavelength bands E and F are transmitted by dichroic surface coating 86. The shorter wavelength bands A and B are again reflected by dichroic coating 87 while the longer wavelength bands C and D are transmitted. Dichroic coating 88 reflects band A and transmits band B while dichroic coating 89 reflects band C and transmits band D. Dichroic coating 90 reflects band E perpendicularly through concave exit face 52e and transmits longer wavelength band F. The rays of transmitted band F pass perpendicularly through concave exit face 52f. Prisms 74, 75, 77, and 78 cause total internal reflection of the rays of bands A–D, respectively, directing those rays perpendicularly through concave exit faces 52a–52d, respectively.

Beamsplitters 40, 42 may be used to provide redundant spectral images. In other applications, however, beamsplitters 40, 42 do not need to be identical. One beamsplitter may be dedicated to bands within the visible spectrum while the other is dedicated to the infrared spectrum. By using two different beamsplitters similar to prism assembly 70, optical system 10 may be made to provide images in at least twelve different spectral bands. The beamsplitters may also be focused upon photodetector arrays maintained at different operating temperatures. The arrays of detectors focused on one beamsplitter may be cooled to a different temperature than those arrays focused on the other beamsplitter because their off-axis locations easily accommodate ancillary equipment without obstructing light rays directed toward the primary objectives.

Lacking moving parts and servomechanisms, stationary dual aperture optical system 10 has good stray light rejection and is capable of simultaneously providing high spectral and high spatial resolution images, for example, to multispectral linear photodetector arrays in an instrument such as a multispectral terrestrial mapping system. The divergent, off-axis orientation of the image planes 40, 42 by spherical mirrors 16, 18 permits the use of large, dichroic beamsplitters 40, 42 to simultaneously split reflected light rays into a very large number of images in different bands over a very wide visible and invisible spectrum without introduction of diffraction effects in the paraxial regions and provides high resolution for long wavelengths. It is possible to obtain much wider spectral ranges with this system because each half of this dual aperture Schmidt may be separately corrected for spherical aberration and color.

Several features may be incorporated into the optical system 10 to enhance its performance. The spherical mirrors 16, 18 may be connected rigidly together as for example, by a mirror bracket or an epoxy type bonding cement 56 applied between their parallel arcuate edges 58, 60. Rigid connection assures the maintenance of precise band-to-band alignment between the focal plane images of spherical mirrors 16, 18 even when the primaries are subjected to motion. Since the beamsplitter elements are positioned close to the focal planes 4, 6, their optical lever arm is quite short, thus maintaining good optical alignment even when subjected to some motion. When made with entrance and exit faces optically concentric to their respective aperture stops, all off-axis aberrations arising in the beamsplitter are eliminated. Consequently, beamsplitters 40, 42 contribute no aberrations to the system except for small amounts of spherical aberration and longitudinal color. Both aberrations may be compensated for by achromatizing and modifying the spherical aberration correction of the corrector plates. Concentricity of the beamsplitters, focal planes, and primary mirrors make the effects of coatings upon their surfaces independent of position in the field of view, thereby increasing the uniformity of response. The performance of optical system 10 may be made, therefore, nearly aberration free, limited only by small amounts of off-axis aberrations of coma and astigmatism introduced by weak corrector plates 32, 34. When the optic axes 36, 38 of both primaries are axially aligned to point in the same direction and azimuth, photodetector arrays (not shown) positioned at the spherical focal planes 44, 46 will be conjugate to the same line along a terrestrial surface and there will be counterpart correspondence between individual detectors in all spectral bands.

Other modifications may be made in the performance of optical system 10 by changing the characteristics of various of its elements. It is possible, for example, to configure refractor corrector plates 32, 34 for optimal chromatic correction in different spectral regions because the corrector plates are extremely weak in power. One or both of the corrector plates 32, 34 may be removed and replaced with elements transmissive in different spectral regions as may be necessary, for example, to accommodate a thermal infrared photodetector array, without significantly affecting focal length or distrotion. Alternatively, in less demanding chromatic correction applications both corrector plates may be replaced with a single refractive corrector plate. Compound, all-spherical corrector plates may be used in place of aspheric corrector plates in other applications.

Ideally, the primary spherical mirrors are assured of precise equality in focal lengths by being cut from a single, faster parent spherical mirror. Should the photodetectors fed by one of the objectives 12, 14 be of a different size than those fed by the other objective, two off-axis Schmidt objectives of different focal lengths may be juxtaposed with their primary spherical mirrors bonded together. Although bonding of the primaries in such a configuration provides only partial compensation for misalignments due to movement of the primaries, the similarity between the two objectives (e.g., one is a scaled version of the other), will cause distortion effects along each band to be identical.

I claim:

1. A Schmidt optical objective (10), comprising:
   a pair of primay mirrors (16, 18) having concave spherical reflective surfaces (17, 19) positioned on opposite sides of a common plane (x, z) of optical symmetry, said spherical reflective surfaces having separated centers of curvature (20, 22) and focal planes (44, 46) along parallel optical axes (36, 38) spaced apart laterally from opposite sides of said common plane; means (32, 34) positioned between said centers of curvature and intersecting said common plane for transmitting light and introducing correcting aberrations in said transmitted light equal and opposite to the total of aberrations produced by said primary mirrors;
   a beam separating element (40/42) having an entrance and an exit surface, said entrance and exit surfaces being optically concentric to a respective one of said centers of curvature.

2. The Schmidt objective of claim 1 wherein said spherical reflective surfaces (17, 19) are oriented to form diverging focal planes.

3. The Schmidt objective of claim 1 wherein said spherical reflective surfaces (17, 19) are oriented to form said focal planes outside the ray paths of said objective.

4. The Schmidt objective of claim 1 wherein said beam separating element (40/42) is positioned at a respective one of said focal planes.

5. The Schmidt objective (10) of claim 1 wherein said entrance surface is positioned at one of said focal planes (44/46) of one of said spherical mirrors (16/18), and said beam separating element has a plurality of exit surfaces (52a–52f) and a plurality of internal dichroic layers (81–83) for reflecting and transmitting different spectral bands of light rays passing through said entrance surface.

6. The Schmidt objective of claim 1 further comprising means (56) for connecting said spherical mirrors rigidly together.

7. The Schmidt objective of claim 5 wherein said plurality of exit surfaces are optically concentric to the center of curvature (20/22) of said spherical mirror.

8. The Schmidt objective of claim 7 wherein said transmitting means comprise a plurality of elements transmissive of different spectral regions.

9. The Schmidt objective of claims 1, 5 or 7 wherein said reflective surfaces have equal focal lengths.

10. The Schmidt objective of claims 1, 5 or 7 wherein said reflective surfaces have unequal focal lengths.

11. The Schmidt objective of claims 1, 5 or 7 wherein said transmitting means comprises a pair of refractor correcting lens (32, 34) transmissive of different spectral bands.

12. The Schmidt objective of claim 7 wherein said beam separating element comprises a plurality of joined prisms (72–80) having internal dichroic layers (81–83), positioned at one of said image planes.

13. The Schmidt objective of claim 12 wherein said joined prisms (72–80) present a convex spherical entrance surface (48) to one of said spherical mirrors.

14. The Schmidt objective of claim 13 wherein each of said dichroic layers reflects a shorter wavelength spectral band and transmits a longer wavelength spectral band.

15. The Schmidt objective of claim 14 wherein said plurality of joined prisms (72–80) have spherical exit faces (52a–52f) optically concentric to said center of curvature.

16. The Schmidt objective of claim 14 or 15 wherein said reflective surfaces (17, 19) have equal focal lengths.

17. The Schmidt objective of claims 14 or 15 wherein said reflective surfaces (17, 19) have unequal focal lengths.

18. A Schmidt optical objective (10), comprising:
   a pair of concave spherical primary mirrors (16, 18) having parallel adjacent edges (58, 60) defining an arc passing through a common plane (x, z) of optical symmetry, and discrete image planes (44, 46) and centers of curvature (20, 22) divergingly disposed along parallel optical axes apart from and on opposite sides of said common plane;
   means (56) for joining said primary mirrors along said parallel arcuate edges;
   at least one spherical aberration correcting lens (32/34) positioned symmetrically about said common plane between said centers of curvature; and
   a pair of refractive beamsplitters (40, 42) having buried dichroic beamsplitting surfaces and entrance and exit surfaces optically concentric to said centers of curvature, positioned at said image planes.

* * * * *